United States Patent [19]
Van Lith et al.

[11] Patent Number: 5,837,802
[45] Date of Patent: Nov. 17, 1998

[54] FAST SETTING WATER SENSITIVE POLYAMIDES HAVING A HIGH $T_G$

[75] Inventors: Gregory J. Van Lith, Fridley; Mark S. Kroll, Arden Hills; Leslie J. Clapp, Wyoming, all of Minn.

[73] Assignee: H. B. Fuller Licensing & Financing, Inc., St. Paul, Minn.

[21] Appl. No.: 920,748

[22] Filed: Aug. 29, 1997

[51] Int. Cl.⁶ .......................... C08G 69/08; C08G 73/10; C08G 69/40; C09J 5/02
[52] U.S. Cl. ...................... 528/310; 528/322; 528/329.1; 528/331; 528/332; 528/335; 528/339.3; 528/345; 528/347
[58] Field of Search .................. 528/322, 339.3, 528/310, 335, 329.1, 347, 345, 331, 332

[56] References Cited

U.S. PATENT DOCUMENTS

| | | | |
|---|---|---|---|
| 3,882,090 | 5/1975 | Fagerberg et al. | 528/338 |
| 5,053,484 | 10/1991 | Speranza et al. | 528/338 |
| 5,086,162 | 2/1992 | Speranza et al. | 528/347 |
| 5,118,785 | 6/1992 | Speranza et al. | 528/339 |
| 5,324,812 | 6/1994 | Speranza et al. | 528/338 |

FOREIGN PATENT DOCUMENTS

WO 96/08538   3/1996   WIPO.

OTHER PUBLICATIONS

Texaco Chemical Company, Jeffamine Amines—Polyamides From Polyoxyethylene Diamines, Nov. 3, 1992, Prepared by George Speranza and Chris Henkee.

*Primary Examiner*—P. Hampton-Hightower
*Attorney, Agent, or Firm*—Nancy N. Quan; Lisa L. Ryan

[57] ABSTRACT

The present invention relates to a fast setting water sensitive polyamide composition which is the reaction product of at least one reactant which is a dicarboxylic acid, ester or anhydride thereof and at least one reactant is a diamine wherein at least one of said diamines is polyoxyalkylene diamine and at least one of said other reactants is aromatic and said polyamide composition has a $T_g$ of greater than about 15° C. and a $\Delta H$ greater than 0 Joules/gram.

26 Claims, No Drawings

FAST SETTING WATER SENSITIVE POLYAMIDES HAVING A HIGH $T_G$

FIELD OF THE INVENTION

This invention relates to a fast setting water sensitive hot melt polyamide composition which is the reaction product of at least one dicarboxylic acid, ester or anhydride thereof and at least one diamine wherein at least one of the diamines is polyoxyalkylene diamine and at least one of the other reactants is aromatic. The resultant composition has a high glass transition temperature and a low heat of fusion.

BACKGROUND OF THE INVENTION

Polyamide polymers are used in a variety of applications where water sensitivity is required such as for envelopes, stamps, packaging tapes, stickers and labels. The particular characteristic which is required for these applications is remoistenability.

Remoistenability refers to the ability of the adhesive composition to be activated through the use of water, for instance. The adhesive composition is applied to a first surface or substrate, moistened and then mated to a second surface or substrate. For example, a stamp or mailing label may be applied in this way to an envelope.

In addition to remoistenability, the adhesive composition must be able to withstand fluctuations in temperature such as high ambient temperatures without undesirable premature bonding of the coated substrates or premature bonding under ambient humid conditions where the adhesive surface becomes tacky as a result of too much absorption of water from the surrounding atmosphere.

When preapplied to substrates, for example labels, the adhesive must not block or tear fiber prematurely when in storage under high temperatures and humid conditions.

Further useful characteristics of a hot melt adhesive include a fast rate of set, fast melt down rates and good machinability.

The present inventors have discovered that superior properties may be achieved through the use of a polyamide which is semi-crystalline in character while retaining a high ($T_g$).

SUMMARY OF THE INVENTION

The present invention relates to a water sensitive polyamide composition which is the reaction product of at least one dicarboxylic acid, ester or anhydride thereof and at least one diamine wherein at least one of the diamines is polyoxyalkylene diamine and at least one of the reactants is aromatic.

The resultant composition is characterized as having a $T_g$ greater than about 15° C., preferably greater than about 20° C., more preferably greater than about 25° C. and most preferably greater than about 30° C. and a heat of fusion or enthalpy, $\Delta H$, of greater than 0 Joules per gram, preferably greater than 5 Joules/gram, more preferably greater than about 10 Joules/gram and most preferably greater than about 15 Joules/gram.

The present invention further relates to a water sensitive polyamide adhesive which is the reaction product of at least one aromatic dicarboxylic acid, the ester or anhydride thereof having the general formula:

$(C_6H_4)_xR'[COOR]_2$ 

wherein x is a number from about 1 to about 3, R' is oxygen, alkyl or substituted alkyl and R is hydrogen or an alkyl of 1 to 4 carbon atoms or an aromatic diamine; at least one polyoxyalkylene diamine having one of the following general formulas:

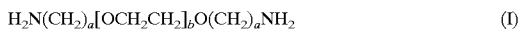
$H_2N(CH_2)_a[OCH_2CH_2]_bO(CH_2)_aNH_2$ (I)

where a is 1 to 3 and b is 1 to 3; or

$NH_2[CHR''{-}CH_2O]_xCHR''CH_2NH_2$ (II)

where x is from about 2 to 5 and R" is hydrogen or an alkyl of 1 to 4 carbons atoms; or

$NH_2CHR'''CH_2[OCHR'''CH_2]_c[OCH_2CH_2]_d[OCH_2CHR''']_eNH_2$ (III)

where the sum of c+e ranges from about 2 to about 8, d ranges from about 12 to about 50 and R''' is an alkyl group of 1 to 4 carbon atoms; at least one aliphatic dicarboxylic acid, anhydride or ester thereof having from about 5 to about 36 carbon atoms and at least one aliphatic diamine having the following formulas:

$H_2NCH_2CH_2CH(C_2H_5)NH_2$ (I)

and

$H_2NCH_2CH(CH_3)(CH_2)_3NH_2$ (II)

and

$H_2N(CH_2)_xNH_2$ (III)

where x is from about 2 to about 12.

The present invention further relates to a water sensitive polyamide adhesive which is the reaction product of from about 15% to about 25% by weight of the reactants of an aromatic compound selected from the group consisting of aromatic dicarboxylic acids, anhydrides or esters thereof and aromatic diamines and mixtures thereof; from about 5% to about 30% by weight of at least one polyoxyalkylene diamine selected from the group consisting of those diamines having the general formulas:

$H_2N(CH_2)_a[OCH_2CH_2]_bO(CH_2)_aNH_2$ (I)

where a is 1 to 3 and b is 1 to 3; and

$NH_2[CHR''{-}CH_2O]_xCHR''CH_2NH_2$ (II)

where x is from about 2 to 5 and R" is hydrogen or an alkyl of 1 to 4 carbons atoms; and

$NH_2CHR'''CH_2[OCHR'''CH_2]_c[OCH_2CH_2]_d[OCH_2CHR''']_eNH_2$ (III)

where the sum of c+e ranges from about 2 to about 8, d ranges from about 12 to about 50 and R''' is an alkyl group of 1 to 4 carbon atoms; from about 25% to about 35% by weight of an aliphatic dicarboxylic acid, anhydride or ester thereof having from about 5 to about 35 carbons atoms and from about 5% to about 25% by weight of the reactants of at least one aliphatic diamine having the following formulas:

$H_2NCH_2CH_2CH(C_2H_5)NH_2$ (I)

and

$H_2NCH_2CH(CH_3)(CH_2)_3NH_2$ (II)

and

$H_2N(CH_2)_xNH_2$ (III)

where is x number from about 2 to about 12.

These polyamides are therefore characterized as being semi-crystalline or highly amorphous, as measured by a low $\Delta H$ and high $T_g$.

The compositions are further characterized as having a fast rate of set of less than about 5 seconds, and even less than about 1 second as measured by the amount of time it takes to become nontacky when applied molten at a film thickness of about 1 mil. The compositions also remoisten much quicker than commercially available polyamides as measured by the amount of time it takes to develop fiber tear after moistening the composition which has been applied to a first substrate and then applying it to a second substrate after remoistening.

The compositions are further characterized as having a melting point of less than about 200° C. and preferably less than about 175° C.

DETAILED DESCRIPTION

In the simplest embodiment of the present invention, the water sensitive polyamide composition is the reaction product of an aromatic dicarboxylic acid and a polyoxyalkylene diamine, the requirement being that there is some aromatic character and some aliphatic character in the resultant polyamide. The aromaticity raises the $T_g$ and the aliphatic and aromatic combination result in a semicrystalline polyamide.

In a second embodiment, a polyoxyalkylene diamine is reacted with an aliphatic dicarboxylic acid and the aromaticity may be supplied by an aromatic diamine.

A third embodiment could include a polyamide which is the reaction product of an aromatic dicarboxylic acid, an aliphatic dicarboxylic acid and a polyoxyalkylene diamine.

The polyamide, in a fourth embodiment, could be the reaction product of an aromatic dicarboxylic acid, an aliphatic dicarboxylic acid, an aliphatic diamine and a polyoxyalkylene diamine.

Many combinations of at least one polyoxyalkylene diamine, aromatic dicarboxylic acids, esters of anhydrides thereof, aromatic diamines, aliphatic dicarboxylic acids and aliphatic diamines may be used. The main requirement is that there be at least one polyoxyalkylene diamine and at least one dicarboxylic acid. The aromaticity and the aliphatic character may be supplied in any way once the two aforementioned ingredients are present. The present inventors envision many possible combinations as long as the reactants supply some aromaticity and some aliphatic character to the resultant water sensitive polyamide to obtain the high glass transition temperature and the low heat of fusion.

The aromatic compounds useful herein are aromatic dicarboxylic acids, esters or anhydrides thereof or aromatic diamines. The aromatic dicarboxylic acids may have the following general formula:

$(C_6H_4)_xR'[COOR]_2$ wherein x is a number from about 1 to about 3, R' is oxygen, alkyl or substituted alkyl and R is hydrogen or an alkyl of 1 to 4 carbon atoms or an aromatic diamine having the following general formula:

$(C_6H_4)_xR'[NH_2]_2$ where x is a number from about 2 to about 60 and R' is oxygen, alkyl or substituted alkyl.

In a preferred embodiment, the dicarboxylic acid has x=1 R' is oxygen and R is a methyl group and has the formula $(C_6H_4)[COOCH_3]$ and is otherwise known as dimethyl- terephthalate or DMT. Another preferred aromatic dicarboxylic, terephthalic acid has the following formula:

$(C_6H_4)[COOH]_2$

Other examples include isophthalic acid and t-butyl isophthalic acid.

Examples of useful aromatic diamines include methylenedianiline $(H_2N(C_6H_4)CH_2(C_6H_4)H_2N)$ available from BASF Corporation located in Parsippany, N.J. and p-phenylene diamine (PPD) or 1,4-benzene diamine $(H_2N(C_6H_4)H_2N)$ available from Du Pont Specialty Chemicals in Wilmington, Del. These aromatic compounds raise the glass transition temperature, $T_g$, of the resultant polyamide composition. These aromatic compounds are useful from about 5% to about 50% by weight of the reactants, preferably from about 5% to about 45% by weight, more preferably from about 15% to about 35% by weight and most preferably from about 15% to about 25% by weight of the reactants.

The polyoxyalkylene diamines useful herein are those having the general formulas:

$H_2N(CH_2)_a[OCH_2CH_2]_bO(CH_2)_aNH_2$ (I)

where a is 1 to 3 and b is 1 to 3; and $NH_2[CHR''{-}CH_2O]_xCHR''CH_2NH_2$ (II)

where x is from about 2 to 5 and R" is hydrogen or an alkyl of 1 to 4 carbons atoms; and $NH_2CHR'''CH_2[OCHR'''CH_2]_c[OCH_2CH_2]_d[OCH_2CHR''']_eNH_2$ (III)

where the sum of c+e ranges from about 2 to about 8, d ranges from about 12 to about 50 and R''' is an alkyl group of 1 to 4 carbon atoms. Preferably the polyoxyalkylene diamine is formed from ethylene oxide. One example is 4,7,10-Trioxatridecane-1,13-diamine (TTD) available from BASF in Parsippany, N.J. From structure I above, when a=2 and b=1, the resultant structure is Jeffamine® EDR-148 diamine available from Huntsman Chemical Co. in Houston, Tex.; when a=2 and b=2 the resultant structure is Jeffamine® EDR-192 from Huntsman and when a=3 and b=2 the resultant structure is 4,7,10-Trioxatridecane-1,13 diamine (TTD) available from BASF is Parsippany, N.J.

In a preferred embodiment, the polyoxyalkylene diamine has the following formula:

$H_2N{-}CH_2CH_2{-}[OCH_2CH_2]_2{-}NH_2$ (triethylene glycol diamine) available from Huntsman Chemical Co. in Houston, Tex. under the tradename of Jeffamine® EDR-148 amine mentioned above.

The Jeffamine® D series and ED series may also be used including Jeffamine® D-230, D-400, ED-600, ED-900 and ED-2001 all available from Huntsman. These polyoxyalkylene diamines may be used alone or in combination with other polyoxyalkylene diamines and are necessary to the water sensitivity of the resultant composition. These diamines are useful from about 5% to about 50% by weight of the reactants, preferably from about 5% to about 40% by weight and more preferably from about 5% to about 30% by weight of the reactants. Changing the molecular weight of the polyoxyalkylene diamine being used requires that the weight percent of the diamine reactant be changed as well to maintain the properties desired.

The aliphatic dicarboxylic acids useful to the present invention are those having from about 5 to about 36 carbon atoms, esters or anhydrides thereof. These acids, esters or anhydrides generally have the following formula:

$(CH_2)_x[COOR]_y$ where x is an integer from about 5 to about 36, R may be hydrogen or an alkyl group of 1 to 4 carbon atoms and y is an integer of 1 or 2. Some examples of useful acids include adipic acid (x=4, R is hydrogen and y=2), a linear dicarboxylic acid having 6 carbon atoms. These acids are useful from about 5% to about 35% by weight of the reactants, preferably from about 15% to about 35% and more preferably from about 25% to about 35%.

The aliphatic diamines useful herein are those which may have the following general formula:

$H_2N(CHR)_xNH_2$ where x is a number greater than about 2 and R may be a hydrogen or an alkyl group having 1 to 4 carbon atoms. More specifically, the useful aliphatic diamines have the following formulas:

$H_2NCH_2CH_2CH(C_2H_5)NH_2$ (I)

$H_2NCH_2CH(CH_3)(CH_2)_3NH_2$ (II)

and $H_2N(CH_2)_xNH_2$ (III)

where x is number from about 2 to about 12.

These aliphatic diamines are useful in amounts greater than about 5% by weight of the reactants, preferably from about 5% to about 25% by weight and more preferably from about 5% to about 15% by weight of the reactants. In a preferred embodiment, 2-methylpentamethylene diamine, available under the tradename of Dytek® A Amine from Du Pont de Nemours & Co., is utilized.

Other useful aliphatic diamines include poly(alkylene glycol) diamines having the following general formula:

$H_2NCH(CH_3)CH2[OCH_2CH(CH_3]_x—NH_2$ where x is an integer from about 2 to about 3.

Utilizing a mixture of aliphatic and aromatic compounds reduces the crystallinity of the finished polyamide while the aromatic compounds help to sustain a higher $T_g$. It is surmised that this helps improve the rate at which the resultant composition may be remoistened as well as lowering the melt rate.

The present inventors contemplate that other diamines that do not adversely affect the remoistenability or other physical characteristics of the present invention and help to reduce crystallinity may also be used in combination with the polyalkylene diamines. They may also be utilized to control the molecular weight of the polyamide composition.

Mono amines and mono carboxylic acids may also be utilized in the compositions to control the molecular weight of the final product. An example of a useful mono acid is stearic acid, a linear acid having 18 carbon atoms and available from Henkel Corp. in Duesseldorf, Germany under the tradename of Emersol® 132 and an example of a useful monoamine is stearyl amine available from Akzo Nobel in Holland. These mono amines or mono acids are useful from about 0% to about 35% by weight of the reactants, preferably from about 0% to about 25% by weight and more preferably from about 0% to about 15% by weight. These mono functional components only affect the viscosity of the resultant polyamide and have been found to have no affect on the other characteristics.

The resultant compositions are copolymers which typically have slower rates of set than homopolymers. Surprisingly, the compositions of the present invention have a fast rate of set of less than about 5 seconds and even less than about 1 second as measured by the amount of time it takes a film of about 1 mil (25/grams/sq meter) thickness to become nontacky. This has been achieved utilizing semi-crystalline or relatively amorphous polyamide compositions by having a high $T_g$. Typically, fast setting, nontacky products are obtained with highly crystalline materials.

The crystallinity of the products is measured by the heat of fusion or enthalpy, ΔH, which is greater than 0 Joules/gram, preferably greater than 1 Joule/gram, more preferably from about 1 Joule/gram to about 30 Joules/gram, more preferably greater than about 5 Joules/gram, more preferably from about 5 Joules/gram to about 30 Joules/gram, more preferably greater than about 10 Joules/gram, more preferably from about 10 Joules/gram to about 25 Joules/gram and most preferably from about 10 Joules/gram to about 20 Joules/gram. It is necessary to the present invention that ΔH be greater than 0 Joules/gram, but not 0 Joules/gram because the finished products must have some amount of crystallinity. It has been found that fully amorphous products are not useful for the present invention. While fully amorphous products may have the rate of remoistenability which is desirable, they fail either the blocking tests or set too slowly. Furthermore, having low crystallinity allows an excellent rate of remoistenability to be retained and also allows for excellent blocking resistance by retaining some crystallinity.

The resultant polyamide compositions have high $T_g$'s of greater than about 15° C., preferably greater than about 20° C., more preferably from about 20° C. to about 60° C., more preferably greater than about 25° C., more preferably from about 25° C. to about 55° C., more preferably greater than about 30° C. and most preferably from about 30° C. to about 55° C. It is surmised that the high $T_g$'s are mostly attributable to the introduction of aromaticity into the polyamide composition. Currently available products have $T_g$'s of less than about 0° C. A high $T_g$ is desirable for maintaining a fast rate of set. Utilizing the high $T_g$ to maintain these properties rather than high crystallinity allows one to achieve a better balance between remoistenability, blocking resistance and rate of set than the current compositions which are the state of the art.

The compositions are further characterized as having melting points of less than about 200° C. and preferably less than about 175° C.

A fast rate of set is important for high speed application equipment such as the extrusion equipment used in the packaging industry, as well as for coating equipment such as that used for coating labels, stickers, tapes, stamps and so on. The low tack surface, high melting point and high heat and humidity resistance is important for coating applications where substrates are precoated and stored in warehouses until use. These attributes help to prevent premature bonding, or blocking, of the adhesive where undesirable fiber tear or bonding to other substrates occurs. Blocking occurs where substrates are stacked together, such as labels or stickers, and one label or sticker bonds to the back of another label or sticker making the coated substrate unusable. The low tack surface is also beneficial for coating applications where good die cuttability is desired.

The resultant compositions are highly water sensitive or remoistenable. This may be measured by the amount of fiber tear that may be torn in a short amount of time after adding moisture to the adhesive or coating. Remoistenability is measured by the amount of time it takes to develop fiber tear after moistening the composition which has been applied to a first substrate and then applying it to a second substrate after remoistening. It is surmised that the low crystallinity of the finished product improves the rate of remoistening.

It has been the practice in the industry to obtain a fast rate of set by using highly crystalline materials. The present inventors have found that it is much more advantageous to use semi-crystalline materials with high $T_g$'s to obtain a fast rate of set. The compositions of the present invention have better adhesion and remoisten more rapidly than the more crystalline commercially available products.

These compositions are useful as adhesives, coatings, as films and as nonwoven web materials, and may be used in any application where remoistenability or water sensitivity is required. Some applications include adhesives and coatings for envelopes, stamps, packaging tapes, stickers and labels. The compositions are also useful for construction and sealing of packaging materials such as cases, cartons and bags where recycling of containers is desired, for bookbinding applications, for manufacturing cigarettes, for roll wrapping, core winding and tissue plybonding. These compositions may also be used for various applications in manufacturing disposable articles.

These compositions find particular utility in the nonwoven industry. They may be used for infant diapers and adult incontinent articles including article construction, elastic attachment, core stabilization, and fixation of super absorbent, for medical garments including surgical drapes and gowns and as hospital pads. They also may be used for feminine hygiene articles including adhesives for construction and as garment attachment adhesives for securing a feminine napkin to an undergarment.

The compositions may also be used as films and nonwoven web materials in making disposable articles. Specific examples include the forming of a barrier film for nonwoven hygienic articles and diapers in which the composition is coated in-line onto a nonwoven substrate and using the composition as a raw material to form nonwovens in-line.

These compositions may be applied utilizing standard extrusion type hot melt applicators including multi-bead extrusion and any type of coating equipment and methods including roll coating, slot die coating, noncontact slot coating, gravure coating, fiberization and spray coating including spiral spray coating. Patterns of coating are numerous and may be continuous or interrupted depending on the type of application and whether or not the composition is acting as a film, coating or adhesive.

The following nonlimiting examples further illustrate the present invention.

EXAMPLES

The polyamides were prepared by known methods.

Test Methods

1. Remoistenability

This procedure was used to determine whether a remoistenable hot melt adhesive, after initial application, gave adequate bonding when remoistened and mated to a particular substrate. A sample was heated to about 150° C. and applied to white bond paper substrates using a 0.5 mil metal draw down bar which was also heated to about 150° C. The adhesive was then allowed to cool and the paper was cut into ½ inch strips. The adhesive thickness was measured with a micrometer to ensure that the coating was between about 0.6 mil and 1.0 mil. The adhesive was then conditioned at ambient temperature and 50% humidity for 2 hours. The ½ inch strips were then moistened with room temperature water utilizing an applicator to control the amount of moisture placed on the adhesive. Each strip was then immediately pressed onto a second piece of white bond paper using the same amount of pressure as if closing an envelope. The test may be repeated utilizing various levels of moisture. A minimum of six samples were run for each level of moisture utilized and a control sample was tested at the same time. Fiber tear was rated by 40% or more being excellent, good was between about 10% and 40% and poor fiber tear was less than 10% of the total bond.

2. Set Time After Moistening

This is a test used to measure the amount of time necessary for a sample to tear fiber after addition of moisture and subsequent bonding to a second substrate. A film having a thickness of approximately 0.5 mils is coated onto standard white wove paper stock. Samples are cut into ½ inch wide strips. The adhesive is then moistened with deionized water and adhered to a second, noncoated standard white wove paper stock and the amount of time required to tear fiber is recorded.

3. Rate of Set

This test was utilized to measure the time, in seconds, for a 1 mil film to become tack free after application to a paper substrate. The target range was less than 5 seconds and preferably less than 1 second. A heated draw down bar was utilized to apply a 1 mil film using an application temperature of about 175° C. A stopwatch was started at the same time the adhesive was drawn down. The time was noted, in seconds, that it takes for the adhesive to become tack free by immediately tapping the adhesive with a cotton swab until no cotton fibers stick to the adhesive. The number of seconds were noted.

4. Heat of Fusion or Enthalpy, ΔH

Heats of Fusion were measured using ASTM 794-85, Standard Test Method for Melting and Crystallization Temperatures by Thermal Analysis. The temperature sweep was from –40° C. to 200° C.

5. Glass Transition Temperature, $T_g$

Glass Transition Temperatures were measured using ASTM D 3418-82, Standard Test Method for Transition Temperatures of Polymers by Thermal Analysis. The temperature sweep was from –40° C. to 200° C.

6. Blocking 29° C. (85° F.)/90% RH

This procedure is used to determine the blocking resistance of the polyamide composition under pressure, heat and/or humidity. A film of approximately 0.5 mil thickness is drawn down onto a 8½×11 inch standard white wove paper stock and oven dried at 135° C. for about 1 minute. The adhesive specimen is cut into 1 inch wide strips. A second 1 inch strip of uncoated standard white wove paper stock is then set onto the coated strip. This combination is then placed between two microscope slides and a 500 gram weight is placed onto the microscope slide and the whole ensemble is then put into a chamber at a temperature of about 30° C. and a relative humidity of about 90%. After 24 hours, the samples are removed from the chamber and the uncoated paper stock is removed from the coated stock. The degree of fiber tear or adhesive picking of the fibers is then recorded and each sample is rated on a scale of 1 to 3, 1 being excellent with no fiber tear or slight picking, 2 is fair/passing with picking but a minimal amount of fiber tear and 3 is failing with moderate to heavy fiber tear.

TABLE 1

| | A | B | Example 1 | Example 2 | Example 3 | C | D | E |
|---|---|---|---|---|---|---|---|---|
| EDR-148 | | 46.63 | 24.59 | 7.78 | 27.36 | 23.03 | 18.74 | 4.8 |
| TTD | 55.88 | | | | | | | |
| HMDA | | | 7.01 | 6.77 | 7.15 | 0 | 3.67 | 15.05 |
| Dytek A | | | 8.76 | 24.38 | 7.15 | 18.05 | 18.36 | 18.81 |
| Adipic Acid | 37.12 | 46.1 | 27.82 | 30.21 | 29.26 | 29.56 | 29.15 | 30.81 |
| Dimethyl Terephthalate | | | 20.51 | 21.52 | 20.92 | 21.13 | 22.73 | 22.02 |
| Stearic Acid | 5.5 | 6.82 | 9.8 | 8.84 | 6.66 | 6.73 | 6.85 | 7.02 |
| Irganox 1098 | 1.5 | 0.5 | 1.5 | 0.5 | 1.5 | 1.5 | 0.5 | 1.5 |
| Tg, C | −12 | 4 | 35 | 53 | 35 | 39 | 44 | 58 |
| Delta H, J/gram | 43 | 53 | 16.8 | 1.4 | 20 | 0 | 0 | 20.5 |
| Viscosity, 77° C. (350° F.) | 900 | ** | 1725 | 5775 | 2570 | 2600 | 3100 | ** |
| Tm, C | 133 | 183 | 129 | 154 | 132 | * | * | 180 |
| Set Speed, sec | <1 | <1 | <1 | <1 | <1 | <1 | <1 | <1 |
| Set Time after Remoistening, sec | >120 | >120 | 5 | 20 | 15 | 5 | 30 | N/A |
| Remoistenability | 1 | 1 | 1 | 2 | 1 | 1 | 1 | 3 |
| Block 29° C. (85° F.)/ 90% RH | 1 | 1 | 1 | 2 | 1 | 3 | 3 | 1 |

*Amorphous, no crystalline melt point detected
**Solid at 77° C. (350° F.)
Remoistening & Blocking Rating
1 = Excellent
2 = Fair/Passing
3 = Poor Comparative Examples A and B illustrate some of the current state of the art for remoistenable polyamide compositions. These examples illustrate compositions having high crystallinity and low $T_g$'s. Example A shows good remoistenability but a much longer set time after remoistening. Example B also shows good remoistenability and a much longer set time after remoistening and in addition has too high of a melting point.

Example 1 exhibits a high $T_g$ and a $\Delta H$ of about 17 Joules/gram. This composition has a fast rate of set while maintaining excellent remoistenability and blocking resistance. Example 2 demonstrates the effect of lowering the crystallinity as measured by $\Delta H$. It maintains a fast rate of set but has decreased blocking resistance and remoistens more slowly than Example 1.

Example 3 demonstrates the effect of increasing the amount of crystallinity in the product as measured by $\Delta H$. This example has a slightly slower rate of set than Example 1 and has excellent remoistenability and blocking resistance.

Comparative Examples C and D demonstrate the effect of eliminating the crystallinity, or in other words these examples are completely amorphous. These compositions have good remoistenability but fail blocking tests at 29° C. and 90% relative humidity.

Comparative Example E illustrates the effect of having both a high $T_g$ and high crystallinity. This example exhibits excellent blocking resistance but has inadequate remoistenability characteristics.

We claim:

1. A water sensitive polyamide composition which is the reaction product of at least one reactant which is a dicarboxylic acid, ester or anhydride thereof and at least one reactant is a diamine wherein at least one of said diamines is polyoxyalkylene diamine and at least one of said other reactant is aromatic and said polyamide composition has a $T_g$ greater than about 15° C. and a $\Delta H$ from about 1 to about 30 Joules/gram.

2. The composition of claim 1 wherein at least one of said reactants is an aromatic dicarboxylic acid.

3. The composition of claim 1 wherein at least one of said reactants is an aliphatic dicarboxylic acid and at least one of said reactants is an aromatic diamine.

4. The composition of claim 1 wherein at least one of said reactants is an aromatic dicarboxylic acid, ester or anhydride thereof having the following general formula:

$$(C_6H_4)_xR'[COOR]_2$$

wherein x is a number from about 1 to about 3, R' is oxygen, alkyl or substituted alkyl and R is hydrogen or an alkyl of 1 to 4 carbon atoms.

5. The composition of claim 4 wherein x is 1 and R is methyl.

6. The composition of claim 1 wherein the polyoxyalkylene diamine has the general structure selected from the group consisting of:

$$H_2N(CH_2)_a[OCH_2CH_2]_bO(CH_2)_aNH_2 \qquad (I)$$

where a is 1 to 3 and b is 1 to 3; and $$NH_2[CHR''-CH_2O]_xCHR''CH_2NH_2 \qquad (II)$$

where x is from about 2 to 5 and R'' is hydrogen or an alkyl of 1 to 4 carbons atoms; and $$NH_2CHR'''CH_2[OCHR'''CH_2]_c[OCH_2CH_2]_d[OCH_2CHR''']_eNH_2 \qquad (III)$$

where the sum of c+e ranges from about 2 to about 8, d ranges from about 12 to about 50 and R''' is an alkyl group of 1 to 4 carbon atoms.

7. The composition of claim 6 wherein the polyoxyalkylene diamine is:

$$NH_2CH_2CH_2[OCH_2CH_2]_2NH_2.$$

8. The composition of claim 1 wherein at least one reactant is an aliphatic dicarboxylic acid, ester of anhydride thereof having from about 5 to about 36 carbon atoms.

9. The composition of claim 8 wherein said acid is adipic acid having the formula $(CH_2)_4(COOH)_2$ and said aromatic compound is an ester having the formula $C_6H_4(COOCH_3)_2$.

10. The composition of claim 1 wherein at least one reactant is an aliphatic diamine selected from the group consisting of:

$$H_2NCH_2CH_2CH(C_2H_5)NH_2 \quad (I);$$

$$H_2NCH_2CH(CH_3)(CH_2)_3NH_2 \quad (II)$$

and $$H_2N(CH_2)_xNH_2 \quad (II)$$

where x is number from about 2 to about 12.

11. The composition of claim 1 produced by further reacting up to about 10% by weight in the composition of at least one compound selected from the group consisting of mono acids and mono amines.

12. The composition of claim 1 wherein the $T_g$ is greater than about 25° C. and $\Delta H$ is greater than about 10 Joules/gram.

13. The composition of claim 1 wherein the rate of set is less than about 5 seconds.

14. A method of utilizing the composition of claim 1 as a remoistenable adhesive on articles selected from the group consisting of envelopes, stamps, packaging tapes, labels and stickers, comprising the steps of:

a) applying said composition to a first substrate;

b) moistening said composition; and c) applying a second substrate after said moistening; wherein said composition develops at least 10% fiber tear from either of said first substrate or said second substrate and has a set time after remoistening of about 5 seconds to about 30 seconds.

15. The method of utilizing the composition of claim 1 on a nonwoven material.

16. The method of utilizing the composition of claim 1 as a film.

17. A water sensitive polyamide composition which is the reaction product of:

a) from about 15% to about 25% by weight of the reactants of at least one aromatic compound selected from the group consisting of aromatic dicarboxylic acids, their esters and anhydrides thereof, aromatic diamines, and mixtures thereof;

b) from about 5% to about 30% by weight of the reactants of at least one polyolxyalkylene diamine selected from the group consisting of those diamines having the general formula;

$$H_2N(CH_2)_a[OCH_2CH_2]_bO(CH_2)_aNH_2 \quad (I)$$

and
where a is 1 to 3 and b is 1 to 3;

$$NH_2[CHR''{-}CH_2O]_xCHR''CH_2NH_2 \quad (II)$$

where x is from about 2 to 5 and R" is hydrogen or an alkyl of 1 to 4 carbons atoms; and $$NH_2CHR'''CH_2[OCHR'''CH_2]_c[OCH_2]_d[OCH_2CHR''']_eNH_2 \quad (III)$$

where the sum of c+e ranges from about 2 to about 8, d ranges from about 12 to about 50 and R'" is an alkyl group of 1 to 4 carbon atoms c) from about 25% to about 35% by weight of the reactants of at least one aliphatic dicarboxylic acid, anhydride or ester thereof having from about 5 to about 36 carbon atoms; and d) from about 5% to about 25% by weight of the reactants of at least one aliphatic diamine;

wherein the $T_g$ of the resulting polyamide is greater than about 15° C. and $\Delta H$ is from about 1 to about 30 Joules/gram.

18. The composition of claim 17 wherein the aromatic compound is an aromatic dicarboxylic acid having the following general formula:

$$(C_6H_4)_xR'[COOR]_2$$

wherein x is a number from about 1 to about 3, R' is oxygen, alkyl or substituted alkyl and R is hydrogen or an alkyl group of 1 to 4 carbon atoms.

19. The composition of claim 17 wherein the aliphatic diamine is selected from the group consisting of those diamines having the following general formulas:

$$H_2NCH_2CH_2CH(C_2H_5)NH_2 \quad (I)$$

and $$H_2NCH_2CH(CH_3)(CH_2)_3NH_2 \quad (II)$$

and $$H_2N(CH_2)_xNH_2 \quad (III)$$

wherein x is a number from about 2 to about 12.

20. The composition of claim 17 comprising wherein said at least one polyoxyalkylene diamine has the following formula:

$$NH_2CH_2CH_2{-}[OCH_2{-}CH_2]_2{-}NH_2.$$

21. The composition of claim 17 wherein the $T_g$ is greater than about 25° C. and $\Delta H$ is greater than about 10 Joules/gram.

22. The composition of claim 17 wherein the rate of set is less than about 5 seconds.

23. A method of utilizing the composition of claim 17 as a remoistenable adhesive on articles selected from the group consisting of envelopes, stamps, packaging tapes, labels and stickers, comprising the steps of:

a) applying said composition to a first substrate;

b) moistening said composition; and c) applying a second substrate after said moistening; wherein said composition develops at least 10% fiber tear from either of said first substrate or said second substrate and has a set time after remoistening of about 5 seconds to about 30 seconds.

24. The method of utilizing the composition of claim 17 on a nonwoven.

25. The composition of claim 1 wherein said composition has a $\Delta H$ from about 5 to about 30 Joules/gram.

26. The composition of claim 17 wherein said composition has a $\Delta H$ from about 5 to about 30 Joules/gram.

* * * * *

UNITED STATES PATENT AND TRADEMARK OFFICE
CERTIFICATE OF CORRECTION

PATENT NO. : 5,837,802
DATED : November 17, 1998
INVENTOR(S) : Gregory J. Van Lith It is certified that error appears in the above-identified patent and that said Letters Patent is hereby corrected as shown below:

On the title page, item [75], "Greg J. Van Lith" should read -- Gregory J. Van Lith --.

Signed and Sealed this

Thirtieth Day of March, 1999

Attest:

Q. TODD DICKINSON

Attesting Officer

Acting Commissioner of Patents and Trademarks